US009147196B2

(12) United States Patent  
Hansen et al.

(10) Patent No.: US 9,147,196 B2  
(45) Date of Patent: *Sep. 29, 2015

(54) SYSTEM AND METHOD FOR DELIVERING A RESTRICTED USE IN-STORE PROMOTION TO A CONSUMER

(75) Inventors: Gregory Hansen, Township of Washington, NJ (US); Seth H. Sarelson, New York, NY (US); Johnathan A. Treiber, New York, NY (US)

(73) Assignee: OnCard Marketing, Inc., New York, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/008,389

(22) Filed: Jan. 18, 2011

(65) Prior Publication Data

US 2012/0143671 A1    Jun. 7, 2012

Related U.S. Application Data

(63) Continuation-in-part of application No. 13/007,824, filed on Jan. 17, 2011, which is a continuation-in-part of application No. 12/958,984, filed on Dec. 2, 2010.

(51) Int. Cl.  
*G06Q 30/02* (2012.01)

(52) U.S. Cl.  
CPC ........ *G06Q 30/0239* (2013.01); *G06Q 30/0241* (2013.01); *G06Q 30/0248* (2013.01)

(58) Field of Classification Search  
CPC .......... G06Q 30/0207; G06Q 30/0241; G06Q 30/0239  
USPC ........................................................ 705/14  
See application file for complete search history.

(56) References Cited

U.S. PATENT DOCUMENTS 3,824,544 A    7/1974 Simjian  
3,833,795 A    9/1974 Shoshani  
(Continued)

FOREIGN PATENT DOCUMENTS

CA    2254378 A1    10/1999  
WO    WO9427258 A2    11/1994  
(Continued)

OTHER PUBLICATIONS

Final Office Action received for U.S. Appl. No. 12/152,184, mailed on Jul. 6, 2012, 13 pages.  
(Continued)

*Primary Examiner* — John Hayes  
*Assistant Examiner* — Tim Hale  
(74) *Attorney, Agent, or Firm* — Patent GC LLC

(57) ABSTRACT

A system and method for delivering a restricted use in-store promotion to a consumer includes storing in an offer database a plurality of offer data items for use in creating an in-store promotion. The method further includes storing in an authorization database an authorization parameter and generating at a server a hyperlink including the authorization parameter. In response to receiving a request from a consumer device to present the in-store promotion, the server verifies that the consumer browser invoked the hyperlink containing the authorization parameter. The server also verifies the status of the authorization parameter. If the consumer browser invoked the hyperlink containing the authorization parameter and the status is active, the server dynamically generates the in-store promotion using at least one of the plurality of data items stored in the offer database. Once generated, the server transmits the in-store promotion to the consumer device.

24 Claims, 7 Drawing Sheets

(56) References Cited

U.S. PATENT DOCUMENTS

| | | |
|---|---|---|
| 4,463,250 A | 7/1984 | McNeight |
| 4,554,446 A | 11/1985 | Murphy et al. |
| 4,641,347 A | 2/1987 | Clark |
| 4,674,041 A | 6/1987 | Lemon et al. |
| 4,725,718 A | 2/1988 | Sansone |
| 4,794,530 A | 12/1988 | Yukiura |
| 4,941,090 A | 7/1990 | McCarthy |
| 4,965,437 A | 10/1990 | Nagai |
| 5,117,355 A | 5/1992 | McCarthy |
| 5,128,752 A | 7/1992 | Von Kohorn |
| 5,227,874 A | 7/1993 | Von Kohorn |
| 5,239,480 A | 8/1993 | Huegel |
| 5,243,174 A | 9/1993 | Veeneman |
| 5,283,422 A | 2/1994 | Storch |
| 5,285,278 A | 2/1994 | Holman |
| 5,408,417 A | 4/1995 | Wilder |
| 5,537,314 A | 7/1996 | Kanter |
| 5,598,477 A | 1/1997 | Berson |
| 5,636,346 A | 6/1997 | Saxe |
| 5,710,886 A | 1/1998 | Christensen |
| 5,715,399 A | 2/1998 | Bezos |
| 5,724,520 A | 3/1998 | Goheen |
| 5,732,398 A | 3/1998 | Tagawa |
| 5,754,654 A | 5/1998 | Hiroya |
| 5,761,648 A | 6/1998 | Golden et al. |
| 5,797,126 A | 8/1998 | Helbling |
| RE36,116 E | 2/1999 | McCarthy |
| 5,870,718 A | 2/1999 | Spector |
| 5,884,277 A | 3/1999 | Khosla |
| 5,907,830 A | 5/1999 | Engel |
| 5,937,391 A | 8/1999 | Ikeda et al. |
| 5,945,653 A | 8/1999 | Walker et al. |
| 5,948,040 A | 9/1999 | DeLorme |
| 5,953,705 A | 9/1999 | Oneda |
| 5,999,914 A | 12/1999 | Blinn et al. |
| 6,029,141 A | 2/2000 | Bezos et al. |
| 6,035,280 A | 3/2000 | Christensen |
| 6,067,532 A | 5/2000 | Gebb |
| 6,192,349 B1 | 2/2001 | Husemann |
| 6,193,155 B1 | 2/2001 | Walker |
| 6,216,227 B1 | 4/2001 | Goldstein |
| 6,222,914 B1 | 4/2001 | McMullin |
| 6,223,166 B1 | 4/2001 | Kay |
| 6,236,971 B1 | 5/2001 | Stefik |
| 6,240,396 B1 | 5/2001 | Walker |
| 6,243,688 B1 | 6/2001 | Kalina |
| 6,321,208 B1 | 11/2001 | Barnett et al. |
| 6,336,099 B1 | 1/2002 | Barnett et al. |
| 6,345,261 B1 | 2/2002 | Feidelson et al. |
| 6,386,451 B1 | 5/2002 | Sehr |
| 6,473,790 B1 | 10/2002 | Tagi |
| 6,505,179 B1 | 1/2003 | Kara |
| 6,631,358 B1 | 10/2003 | Ogilvie |
| 6,633,850 B1 | 10/2003 | Gabbard et al. |
| 6,690,794 B1 | 2/2004 | Terao |
| 6,826,594 B1 | 11/2004 | Pettersen |
| 6,842,741 B1 | 1/2005 | Fujimura |
| 6,868,402 B1 | 3/2005 | Hirota |
| 6,904,408 B1 | 6/2005 | McCarthy et al. |
| 6,999,936 B2 | 2/2006 | Sehr |
| 7,013,286 B1 | 3/2006 | Aggarwal et al. |
| 7,020,622 B1 | 3/2006 | Messer |
| 7,127,419 B2 | 10/2006 | Messer et al. |
| 7,249,056 B1 | 7/2007 | Crouthamel et al. |
| 7,319,975 B2 | 1/2008 | Monteverde |
| 7,330,971 B1 | 2/2008 | Kukreja et al. |
| 7,401,032 B1 | 7/2008 | Golden et al. |
| 7,540,415 B2 | 6/2009 | Frank |
| 7,769,648 B1 | 8/2010 | Nolan |
| 8,046,266 B1 | 10/2011 | Geller |
| 8,050,969 B2 | 11/2011 | Golden et al. |
| 8,201,735 B2 | 6/2012 | Frank |
| 8,311,895 B1 | 11/2012 | Murugan |
| 8,640,951 B2 | 2/2014 | Frank |
| 8,666,838 B2 | 3/2014 | Bamborough |
| 8,978,977 B2 | 3/2015 | Frank |
| 2001/0049636 A1 | 12/2001 | Hudda et al. |
| 2002/0002552 A1 | 1/2002 | Schultz et al. |
| 2002/0010627 A1 | 1/2002 | Lerat |
| 2002/0013728 A1 | 1/2002 | Wilkman |
| 2002/0050526 A1* | 5/2002 | Swartz et al. ............ 235/472.02 |
| 2002/0099606 A1 | 7/2002 | Shlagman |
| 2002/0120507 A1 | 8/2002 | Chanos et al. |
| 2002/0128903 A1 | 9/2002 | Kernahan |
| 2002/0145038 A1* | 10/2002 | O'Hagan et al. ............... 235/383 |
| 2002/0157111 A1* | 10/2002 | Reams ........................ 725/112 |
| 2002/0160761 A1* | 10/2002 | Wolfe ......................... 455/414 |
| 2003/0004743 A1 | 1/2003 | Callegari |
| 2003/0055721 A1 | 3/2003 | Beery, II |
| 2003/0065805 A1* | 4/2003 | Barnes, Jr. ................... 709/231 |
| 2003/0079221 A1 | 4/2003 | Bruner |
| 2003/0105641 A1 | 6/2003 | Lewis |
| 2003/0113038 A1* | 6/2003 | Spencer et al. ............... 382/305 |
| 2003/0132298 A1* | 7/2003 | Swartz et al. ............ 235/472.02 |
| 2003/0200146 A1 | 10/2003 | Levin et al. |
| 2003/0236701 A1 | 12/2003 | Rowney et al. |
| 2004/0059683 A1 | 3/2004 | Epstein |
| 2004/0103024 A1 | 5/2004 | Patel et al. |
| 2004/0117247 A1* | 6/2004 | Agrawal et al. ................. 705/14 |
| 2004/0176995 A1 | 9/2004 | Fusz |
| 2004/0199422 A1 | 10/2004 | Napier et al. |
| 2005/0010475 A1* | 1/2005 | Perkowski et al. ............. 705/14 |
| 2005/0038707 A1* | 2/2005 | Roever et al. .................. 705/21 |
| 2005/0038740 A1 | 2/2005 | Ogilvie |
| 2005/0040230 A1* | 2/2005 | Swartz et al. ................. 235/383 |
| 2005/0102181 A1 | 5/2005 | Scroggie |
| 2005/0119937 A1 | 6/2005 | Estes |
| 2005/0171838 A1 | 8/2005 | Eglinton |
| 2005/0256766 A1* | 11/2005 | Garcia et al. .................... 705/14 |
| 2005/0261990 A1 | 11/2005 | Gocht et al. |
| 2006/0041478 A1 | 2/2006 | Zheng |
| 2006/0053437 A1 | 3/2006 | Bruner |
| 2006/0085408 A1 | 4/2006 | Morsa |
| 2006/0167753 A1 | 7/2006 | Teague et al. |
| 2006/0212355 A1 | 9/2006 | Teague |
| 2006/0287871 A1 | 12/2006 | Carrozzi et al. |
| 2007/0106608 A1 | 5/2007 | Khandelwal |
| 2007/0173266 A1 | 7/2007 | Barnes |
| 2007/0174259 A1 | 7/2007 | Amjadi |
| 2007/0244756 A1 | 10/2007 | Stucki |
| 2007/0265921 A1* | 11/2007 | Rempe et al. .................. 705/14 |
| 2008/0027809 A1 | 1/2008 | Storm |
| 2008/0046738 A1 | 2/2008 | Galloway et al. |
| 2008/0065490 A1 | 3/2008 | Novick |
| 2008/0077488 A1 | 3/2008 | Main |
| 2008/0091526 A1 | 4/2008 | Shoemaker |
| 2008/0106560 A1 | 5/2008 | Shibusawa |
| 2008/0109304 A1 | 5/2008 | Sarelson et al. |
| 2008/0109553 A1 | 5/2008 | Fowler |
| 2008/0140509 A1* | 6/2008 | Amjadi ........................ 705/10 |
| 2008/0162304 A1* | 7/2008 | Ourega ........................ 705/27 |
| 2008/0172495 A1 | 7/2008 | Storm |
| 2008/0183571 A1 | 7/2008 | Aaron |
| 2008/0215426 A1* | 9/2008 | Guldimann et al. ............. 705/14 |
| 2008/0221980 A1* | 9/2008 | Greeson et al. ................. 705/14 |
| 2008/0270209 A1 | 10/2008 | Mauseth et al. |
| 2008/0306782 A1 | 12/2008 | Ephrati |
| 2009/0037325 A1 | 2/2009 | Sarelson et al. |
| 2009/0076912 A1 | 3/2009 | Rajan et al. |
| 2009/0157513 A1* | 6/2009 | Bonev et al. ................... 705/14 |
| 2009/0234711 A1* | 9/2009 | Ramer et al. ................... 705/10 |
| 2009/0234714 A1 | 9/2009 | Sarelson et al. |
| 2009/0240582 A1 | 9/2009 | Sheldon-Neal et al. |
| 2009/0249445 A1 | 10/2009 | Deshpande et al. |
| 2009/0259547 A1 | 10/2009 | Clopp |
| 2009/0319368 A1* | 12/2009 | Reardon et al. ............ 705/14.51 |
| 2010/0036272 A1 | 2/2010 | Sarelson et al. |
| 2010/0076836 A1 | 3/2010 | Giordano et al. |
| 2010/0161400 A1 | 6/2010 | Snodgrass et al. |
| 2010/0198678 A1 | 8/2010 | Burst et al. |
| 2010/0228989 A1* | 9/2010 | Neystadt et al. ............... 713/185 |
| 2010/0318407 A1 | 12/2010 | Leff et al. |
| 2011/0010235 A1 | 1/2011 | Kenny |
| 2011/0125565 A1* | 5/2011 | MacIlwaine et al. ....... 705/14.17 |

(56) References Cited

U.S. PATENT DOCUMENTS

| | | | |
|---|---|---|---|
| 2011/0153410 | A1 | 6/2011 | Muthugopalakrishnan et al. |
| 2011/0178867 | A1 | 7/2011 | King |
| 2011/0196731 | A1 | 8/2011 | Christie et al. |
| 2011/0238484 | A1* | 9/2011 | Toumayan et al. ........ 705/14.39 |
| 2011/0270667 | A1 | 11/2011 | Kenny |
| 2011/0295673 | A1 | 12/2011 | Vannoller et al. |
| 2011/0302034 | A1 | 12/2011 | Campbell et al. |
| 2012/0029998 | A1 | 2/2012 | Aversano et al. |
| 2012/0041805 | A1 | 2/2012 | Golden et al. |
| 2012/0096490 | A1 | 4/2012 | Barnes, Jr. |
| 2012/0143680 | A1 | 6/2012 | Hansen et al. |
| 2012/0143682 | A1 | 6/2012 | Hansen et al. |
| 2012/0143690 | A1* | 6/2012 | Hansen et al. ............. 705/14.58 |
| 2012/0234911 | A1 | 9/2012 | Yankovich |
| 2012/0316948 | A1 | 12/2012 | Shipley |

FOREIGN PATENT DOCUMENTS

| | | |
|---|---|---|
| WO | WO9835311 A1 | 8/1998 |
| WO | WO9960489 | 11/1999 |
| WO | WO0231614 A2 | 4/2002 |

OTHER PUBLICATIONS

Final Office Action received for U.S. Appl. No. 12/152,184, mailed on Apr. 1, 2010, 10 pages.
Non Final Office Action received for U.S. Appl. No. 12/152,184, mailed on Aug. 14, 2009, 13 pages.
Non Final Office Action received for U.S. Appl. No. 12/152,184, mailed on Jan. 19, 2012, 12 pages.
Non Final Office Action received for U.S. Appl. No. 12/506,463, mailed on Aug. 1, 2012, 19 pages.
Non Final Office Action received for U.S. Appl. No. 11/888,963, mailed on Aug. 5, 2009, 14 pages.
Non Final Office Action received for U.S. Appl. No. 11/800,120, mailed on Jul. 2, 2009, 17 pages.
Non Final Office Action received for U.S. Appl. No. 13/007,824, mailed on Aug. 15, 2012, 18 pages.
Non Final Office Action received for U.S. Appl. No. 12/958,984, mailed on Oct. 25, 2012, 12 pages.
Non Final Office Action received for U.S. Appl. No. 13/028,514, mailed on Dec. 24, 2012, 42 pages.
Final Office Action received for U.S. Appl. No. 13/007,824, mailed on Dec. 31, 2012, 23 pages.
Final Office Action received for U.S. Appl. No. 12/506,463, mailed on Jan. 16, 2013, 38 pages.
Final Office Action received for U.S. Appl. No. 12/958,984, mailed on Feb. 14, 2013, 30 pages.
Office Action received for U.S. Appl. No. 13/028,514, mailed on Sep. 25, 2013.
Office Action received for U.S. Appl. No. 12/958,984, mailed on Mar. 26, 2015.
Office Action received for U.S. Appl. No. 12/506,463, mailed on Mar. 2, 2015.
Office Action received for U.S. Appl. No. 13/007,824, mailed on Sep. 20, 2014.
Office Action received for U.S. Appl. No. 13/291,148, mailed on Mar. 26, 2015.
Office Action received for U.S. Appl. No. 12/152,184, mailed on Nov. 12, 2014.
Office Action received for U.S. Appl. No. 12/152,184, mailed on Feb. 27, 2014.
Office Action received for U.S. Appl. No. 12/152,184, mailed on Nov. 7, 2013.
Office Action received for U.S. Appl. No. 12/152,184, mailed on May 23, 2013.
Written opinion in PCT Appl. Ser. No. PCT/US00/32497, mailed Feb. 14, 2002, 4 pages (PCT Counterpart U.S. Pat. No. 7540415—Frank).
Authentic ID News for Automated Data Capture Systems Users, vol. 14, No. 2, An Advanstar Publication, Feb. 1998.
Kirby, Carrie. "Tickets Catapult into Syberspace," San Francisco Chronicle. Feb. 3, 2000, p. C-1. (printed Jan. 2, 2009 from http://www.sfgate.com/cgi-bin/article.cgi?f=/c/a/2000/02/03/BU75818.DTL&type=printable).
"Ticketmaster Launches Innovative Ticketing System", Entertainment Wire, Los Angeles, May 17, 1999 (printed Oct. 24, 2008 from http://findarticles.com/p/articles/mi_m0EIN/is_1999_May_17/ai_547649004/print?tag=art . . . ).
"Introduces Electronic Ticketing for Live Entertainment . . . ", San Jose, CA, Business Wire, Nov. 11, 1999 (www.admission.com), 2 pages.
Levy, Doug. "Now Boarding via Cyberspace—Airlines take high-tech route to speed check-in." USA Today, Oct. 18, 1999, p. 4.B (Money section). (printed Jan. 2, 2009 from http://pqasb.pqarchiver.com/USAToday/access/45639306.html?FMT=FT&dids=45639306 . . . ).
Levere, Jane L. "Business Travel; Alaska Airlines plans to offer a system that allows passengers to check in on the internet." New York Times, Sep. 29, 1999. (printed Jan. 2, 2009 from http://query.nytimes.com/gst/fullpage.html?res=9F04E6DF173EF93AA1575AC0A96F9582 . . . ).
eTickets.com Preliminary Business/Financial Case Summary and Funding proposal, as filed in U.S. Appl. No. 09/527,927 (U.S. Pat. Pub. 20030105641).
"MovieFone, Inc. Annoucnes Alliance with Magic Johnson Theatres." Busines Wire, Jan. 7, 1999 (printed Oct. 22, 2008 from http://www.allbusiness.com/media-telecommunications/movies-sound-recording/673821 . . . ).
Weintraub, Eileen et al. "A Ticket to Dot-Com Heaven?". BusinessWeek Online, Apr. 10, 2000 (printed Aug. 11, 2008 from http://www.businessweek.com/2000/00_15/b3676100.htm?scriptFramed).
Waddell, Ray. "Home Ticketing to Come?" Amusement Business, Feb. 7, 2000 (printed Aug. 11, 2008 from http://www.allbusiness.com/services/amusement-recreation-services/4559137-1.html).
"AOL Moviefone Introces 'Print-At-Home' Movie Tickets." BusinessWire, Mar. 6, 2000 (printed Aug. 11, 2008 from http://www.timewarner.com/corp/newsroom/pr/0,20812,666600,00.html).
King, Brad. "Say Goodbye to Will Call." Wired. Jun. 27, 2000 (printed Oct. 22, 2008 from http://www.wired.com/print/techbiz/media/news/2000/06/37254).
Donahue, Ann. "Web Firms Eyeing Market for Print-at-Home Tickets". Los Angeles Business Journal. Feb. 14, 2000 (printed Aug. 11, 2008 from http://www.accessmylibrary.com/coms2/summary_0286-27500711_ITM).
Rundle, Rhonda L. "New Battlefield for E-Tickets: Home Printers". The Wall Street Journal. Apr. 27, 2000, pp. B1 and B4.
Emmons, Natasha. "Ticketmaster Acquisition Has International Flavor". Amusement Business. May 8, 2000 (printed Oct. 23, 2008 from http://www.allbusineess.com/services/amusement-recreation-services/4556387-1.html).
"LinkShare Synergy Technology Overview", www.linkshare.com, Copyright 2002-2005 Linkshare Corporation.
"LinkShare Affiliate Marketing FAQ", received by Seth Sarelson from LinkShare on May 22, 2007.
"Affiliate Marketing", https://web.archive.org/web/20080224114758/http://en.wikipedia.org/wiki/Affiliate_marketing, Feb. 24, 2008.
"Commission Junction." https://web.archive.org/web/20080303211004/http://www.ci.com/case_studies.html#publishers, Mar. 3, 2008.
"LinkShare My Story", https://web.archive.org/web/20080221622593/http://linkshare.com/affiliates/mystory_bradwilson.shtml, Feb. 16, 2008.
"On-demand", www.oxfordleanersdictionaries.com/definition/english/on-demand Aug. 25, 2014.
"On-demand", www.oaadonline.oxfordlearnersdictionaries.com/dictionaly/on+demand Aug. 25, 2014.
"On-demand", www.oxforddictionaries.com/definition/english/on-demand Aug. 25, 2014.

(56) References Cited

OTHER PUBLICATIONS

Office Action received for U.S. Appl. No. 13/007,824 mailed on May 26, 2015.

Notice of Allowability received for U.S. Appl. No. 13/007,824 mailed on Jun. 24, 2015.

* cited by examiner

SYSTEM AND METHOD FOR DELIVERING A RESTRICTED USE IN-STORE PROMOTION TO A CONSUMER

CROSS-REFERENCE TO RELATED APPLICATIONS

This application is a continuation-in-part of co-pending U.S. application Ser. No. 13/007,824 entitled, "A System and Method for Delivering an Authorized In-Store Promotion to a Consumer" filed Jan. 17, 2011, which is a continuation-in-part of co-pending U.S. application Ser. No. 12/958,984, entitled, "A System and Method for Delivering an In-Store Promotion to a Consumer" filed Dec. 2, 2010, the entire contents of which are hereby incorporated by reference.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to the field of sales and marketing. More particularly, the invention relates to the creation, distribution, and tracking of in-store promotions via digital distribution channels and ensuring that only authorized consumers receive the promotions.

In-store promotions are promotions that can be used at the portion of a merchant's business that takes place at a physical or "brick-and-mortar" location. Previous implementations of distributing coupons and other types of in-store promotions through digital media have had serious limitations on both the distribution and tracking of these in-store promotions as well as impeding consumer utilization. Distributing offers via digital media, if not done properly, is difficult to control and can lead to fraudulent distribution and redemptions.

Traditionally, most in-store promotions have been distributed as static images or links to static images that cannot be tracked to a distribution channel (ex. website, email, etc.) or capture more granular detail about that distribution channel (ex. paid search keywords) or consumer (ex. email address). Furthermore, these static images or links to static images can create security issues when an in-store promotion or offer is posted on an unauthorized website, sent via email, shared via social media, or shared via other distribution methods to unintended recipients due to lack of security. These issues have traditionally made advertisers reluctant to utilize digital in-store promotions because these in-store promotions are difficult to control. This reluctance to utilize digital in-store promotions has adversely affected consumers as well by decreasing the number of digital in-store promotions that advertisers make available.

Companies have attempted to address some security issues by requiring consumers to register for a service and install software on their personal computer necessary to view and print the in-store promotions (see Barnett, et al. U.S. Pat. Nos. 6,321,208 and 6,336,099). Many advertisers and consumers view a requirement to register and install software to obtain an in-store promotion as overly invasive and burdensome. These requirements have hindered adoption of digital in-store promotions by both advertisers and consumers.

Requiring user registration and client software installation enables advertisers to provide tracking and security unique to a user's computer, but creates other problems. Consumer adoption and privacy concerns are prevalent with registration and client software. The client software needs to communicate with a server via some internet connectivity and is often flagged as spyware or malware and is blocked by many firewalls and corporate proxy servers. Consumer adoption has suffered greatly with registration due to privacy concerns and lack of support across different computer operating systems. Client software does not work across all computer systems and large populations of consumers are unable to use the software due to incompatibility issues. As consumers upgrade their systems they will need to reinstall and potentially re-register the software.

Consumer registration is also limited to tracking the consumer information used when registered and, in some cases, the distribution channel in broad terms. Distribution via internet search engines, mobile phones and other media where information is dynamic is not possible. Consumer information is often not reliable due to consumers entering in fraudulent information to protect their actual information. Many free email services exist which are used as the registered email address so consumers do not provide their true email address thus defeating the tracking goal.

Technical issues with client software aside from operating system compatibility exist. Client software is often not compatible with many printers. Both old and new printers are not supported or will be lagging in support. End user support often suffers because the software vendor needs to be contacted if print issues arise. Consumers are often confused and frustrated because the website they find the in-store promotion cannot support the client software.

One of the most popular methods for distributing coupons is via email. Advertisers will often segment an email database and send special in-store promotions to different segments of the database to drive an in-store purchase with a promotion. Unfortunately, emails are often forwarded to unintended or unauthorized recipients, which can be very problematic for advertisers that have a limited budget for a promotion and only want the desired recipients to be able to access the promotion. In addition, advertisers are not always able to control the number of times that the promotion is viewed and/or printed.

BRIEF SUMMARY OF THE INVENTION

The invention relates generally to a method and system for delivering an in-store promotion to a consumer. The method includes storing in a database a plurality of predetermined data fields and a plurality of tracking methods for use in creating an in-store promotion. In one embodiment, the database is a secure database for storage of in-store promotion images, in-store promotional text, barcode(s) symbology, structure, and configuration settings for each in-store promotion. The advertiser issuing the in-store promotion provides the information for the predetermined data fields so that the offer may be identified. In one embodiment, the predetermined data fields include the advertiser's/retailer's name and the type of offer. The predetermined data fields may also include the validity dates of the offer and participating store locations. In another embodiment, each component of an in-store promotion is stored separately and independently within the system so that the components may be reused, and distributed separately or in whole. The advertiser may also select one of the tracking methods.

In response to receiving a request from a consumer browser executing on a consumer device to present the in-store promotion, a server in communication with the database dynamically generates the in-store promotion using the information received from the advertiser. In generating the in-store promotion, the server does not request any additional information from the consumer operating the consumer device. Once generated, the server transmits the in-store promotion to the consumer browser. The server also does not send any client software to be stored by the consumer device.

The system provides a usable in-store promotion to an end user/consumer without the need for any registration within the system and without any client software specific to the system. In one embodiment, the in-store promotion can be represented to the consumer in the form of a printable in-store promotion, in-store promotion code, SMS/MMS/email to a mobile phone with barcode, SMS/MMS/email to mobile phone with in-store promotional code, RFID update, etc. In the various embodiments, the offer identifier may be contained in the barcode, in-store promotional code, or other applicable information per the respective delivery mechanism, but can identify information such as, but not limited to, the distribution channel, search keywords, consumer/member identifier (not registered within the system), or any other discretionary information the retailer or advertiser desires to track.

In yet other embodiments, in-store promotions can be configured with fraud protection features that are based on rules the retailer or advertiser sets. In one such embodiment, fraud protection can be turned off or used to control how many times an in-store promotion is printed, printed by a particular consumer, what websites the in-store promotion can be posted on, and/or if the in-store promotion can be forwarded to unintended consumers. In certain embodiments, each fraud protection feature can be adjusted in real time and reset in real time. In other embodiments having fraud protection, in-store promotions are delivered via links each having a unique parameter. The links are particularly effective for email, but can be used via any digital distribution channel. Each link has a unique parameter as in the following example: http://images.revtrax.com/RevTrax/amf.jsp?viewType=viewFull&programId=10305771&mercha ntId=10231201&affiliateId=10306429&uid=UniqueParameter Only links that contain the registered unique parameters are authorized and therefore allowed access to the promotion. When a consumer clicks on a valid link, the user can view, print or perform other operations on the promotion. When a consumer clicks on an invalid or deactivated link, the consumer will be shown an error message or redirected to another page, such as the advertiser's loyalty/email club page.

In another embodiment, the unique parameter may be used to control how many times an in-store promotion is viewed or printed. For example, the advertiser may desire the link to be a single-use link, that is, a link that may only be used to access the in-store promotion a single time. In one such embodiment, the unique parameter is assigned a corresponding status, such as active/inactive. Only links that contain the registered unique parameters having an "active" status are allowed to access the promotion. When a consumer invokes the single use link for the first time, the consumer can view or print the in-store promotion. The status of the parameter is then changed to "inactive". As described above, when a user invokes an invalid or deactivated link, the consumer may be shown an error message or redirected to another page, such as the advertiser's loyalty/email page. In another embodiment, the advertiser can set the number of times that an in-store promotion may be viewed and/or printed to any number that the advertiser desires.

It is therefore an object of the present invention to provide a system and method whereby in-store promotions can be distributed and tracked, along with all advertiser-requested information, without the need for consumer registration and without the need for client software installation. Another object of the invention is to provide a system which provides a mechanism to create, store and distribute in-store promotions across multi-media channels including, but not limited to, print, email, internet, mobile phone, and television. Yet another object of the invention is to prevent fraudulent use of coupons and provide a system and method whereby in-store promotions are delivered only to authorized consumers. Still another object of the invention is to enable an advertiser to set the number of times that an in-store promotion may be viewed and/or printed.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

The attached drawings are intended to better illustrate the present invention without limiting it in any manner whatsoever. Like reference characters in the respective drawn figures indicate corresponding parts or steps.

DETAILED DESCRIPTION OF THE INVENTION

Figure 1A:
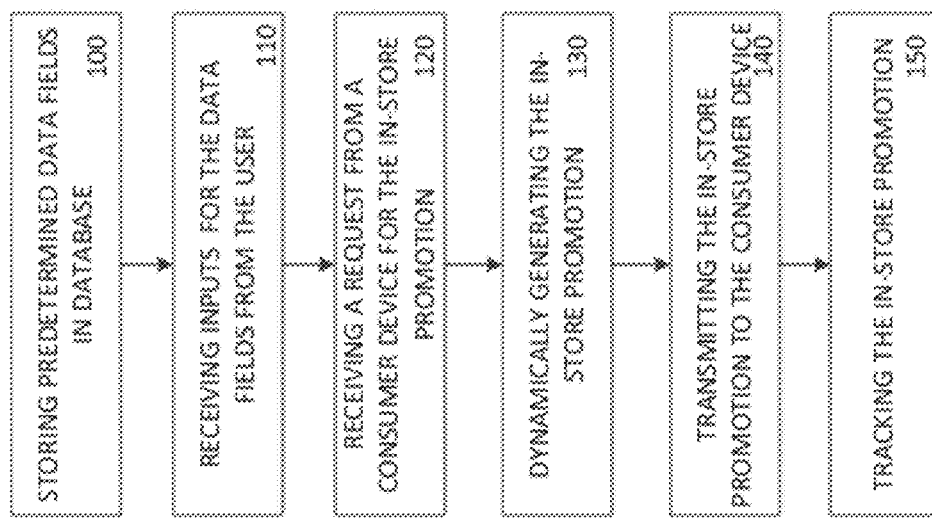
FIG. 1A is a flowchart representation of an embodiment of a process for delivering an in-store promotion to a consumer according to the present invention.

Referring to FIG. 1A and in brief overview, an embodiment of a method for delivering an in-store promotion to a consumer includes storing in a database a plurality of predetermined data fields for use in creating an in-store promotion in step 100. A consumer may be an individual or any other entity to which the advertiser desires to present with the offer. The predetermined data fields are to be completed by the advertiser or the advertiser's agent to define the in-store promotion. In various embodiments, the advertiser may be a retailer, a service provider such as a restaurant, a manufacturer, an advertising agency, or any other entity or person who desires to provide a promotion to a consumer. The retailer, advertiser or other entity offering a promotion may also be referred to herein as the "user". In one embodiment, the database further includes a plurality of tracking methods that may be selected by the advertiser to track the in-store promotion. In one embodiment, the database is a secure database for storage of in-store promotion images, in-store promotional text, barcode(s) symbology, structure, and configuration settings for each in-store promotion. Next, in step 110, the advertiser issuing the in-store promotion provides the information or inputs for the predetermined data fields so that the offer may be identified. In one embodiment, the predetermined data fields include the advertiser's/retailer's name and the type of offer. The predetermined data fields may also include the validity dates of the offer and participating store locations. In yet another embodiment in which the in-store promotion will include a bar code, the plurality of predetermined data fields includes selectable bar code structures. The advertiser must provide inputs for a sufficient number predetermined data fields so that the offer may be identified. In another embodiment, each component of an in-store promotion is stored separately and independently within the system so that the components may be reused, and distributed separately or in whole. The advertiser may also select one of tracking methods. The advertiser may also input an element not previously stored in the database to include in the in-store offer.

Next, in step 120, the system receives a request from a consumer device for the in-store promotion. In response to receiving a request from a consumer device to present the in-store promotion, a server in communication with the database dynamically generates the in-store promotion using the information received from the advertiser in step 130. In generating the in-store promotion, the server does not request any additional information from the consumer operating the consumer device. In one embodiment, the request is sent from a consumer browser operating on a consumer device. In another embodiment, the request is sent by the consumer invoking a hyperlink. In yet another embodiment, the request may be received via an email, SMS or text message, or any other method for communicating a request to the server.

In one embodiment, the server dynamically generating the in-store promotion generates an offer identifier that may be used to identify the in-store promotion. The offer identifier may be a bar code, a bar code capable of being read by a point of sale device at a store, an in-store promotional code or any other picture, text, sound, graphic or other identifying mechanism that may be used to identify the offer. In an embodiment in which the server generates a bar code, the bar code may be an additional bar code to a bar code the advertiser has already placed on the in-store offer. In yet another embodiment, the offer identifier is included a single bar code placed on the in-store offer. In this embodiment, the single bar code conveys all the information required by the advertiser and is in a format already recognized by the advertiser's equipment.

Once generated, in step 140 the server transmits the in-store promotion to the consumer device. In transmitting the promotion to the consumer, the server does not send any system-specific client software to be stored by the consumer device. The system provides a usable in-store promotion to an end user/consumer without the need for any registration within the system and without any client software specific to the system. In one embodiment, the server transmits the in-store offer to the consumer device through an electronic communication channel. In one embodiment, the in-store promotion can be represented to the user in the form of a printable in-store promotion, in-store promotion code, SMS/MMS/text message/email to a mobile phone with barcode, SMS/MMS/ text message/email to mobile phone with in-store promotional code, RFID update, etc. In the various embodiments, the offer identifier may be contained in the barcode, in-store promotional code, or other applicable information per the respective delivery mechanism, but can identify information such as, but not limited to, the distribution channel, search keywords, consumer/member identifier (not registered within the system), or any other discretionary information the retailer or advertiser desires to track.

As described above, the advertiser may select a tracking method. In an embodiment of the system in which the advertiser has selected a tracking method, the system proceeds to step 150 and tracks the in store promotion upon the consumer accessing the in-store promotion. In yet another embodiment in which the advertiser selects a tracking method, the system tracks the consumer selecting to print the in-store promotion. In still another embodiment, the system uses the tracking method to track the in-store promotion once the consumer redeems the in-store promotion at a store. The tracking methods may include methods for tracking distribution channels, search keywords entered into a browser and/or consumer identification information, or any other discretionary information the retailer or advertiser desires to track.

In one embodiment, in order to track the promotion, the system includes identifying information in the offer identifier. The identifying information may identify the method through which the offer was distributed to the consumer, the internet search words used by the consumer in locating the offer, consumer identification information, or other information the advertiser desires to track. For example, if the consumer requested the offer by invoking a URL, the offer identifier could identify the URL or a reference to the URL that the consumer invoked. The URL could then be tracked in the promotion. In another embodiment, the offer identifier could identify the IP address of the consumer's device or a reference to the IP address of the consumer's device. The IP address of the consumer's device could then be tracked in the promotion. In still another embodiment, if the consumer requested the offer by invoking a URL that contained or passed the consumer's membership or privilege card identifier (previously associated with the consumer), the offer identifier may include the consumer's membership or privilege card identifier. The consumer information may be tracked back to the consumer by the system, or it may be tracked back to the consumer by a separate system maintained by the advertiser. In yet another embodiment, the system stores the tracking information and information that may be later matched with the tracking system is included in the offer identifier. For example, the system may include the number 123 in the offer identifier, and the system may associate the number 123 with a specific consumer member number. When the offer with the number 123 in the offer identifier is redeemed, the system will determine that the number 123 is associated with the consumer member number and will determine that the specific consumer redeemed the offer. In other embodiments, the consumer information may be tracked back to the consumer by the system, or it may be tracked back to the consumer by a separate system maintained by the advertiser. For example, the system may share with the advertiser that the number 123 was assigned to a specific consumer member number and then the advertiser or advertiser's system the specific consumer that redeemed the offer.

In still another embodiment, the system may generate and send a cookie to the consumer's device. It is important to note that the cookie is not application-specific software that is required to be stored or executed by the consumer device in order for the consumer to receive/print/redeem the offer. In one such embodiment, the offer identifier includes information for the cookie.

In yet other embodiments, in-store promotions can be configured with fraud protection features that are based on rules the retailer or advertiser sets. In one such embodiment, fraud protection can be turned off or used to control how many times an in-store promotion is printed, printed by a particular consumer, what websites the in-store promotion can be posted on, and/or if the in-store promotion can be forwarded to unintended consumers. In certain embodiments, each fraud protection feature can be adjusted in real time and reset in real time.

Figure 1B:
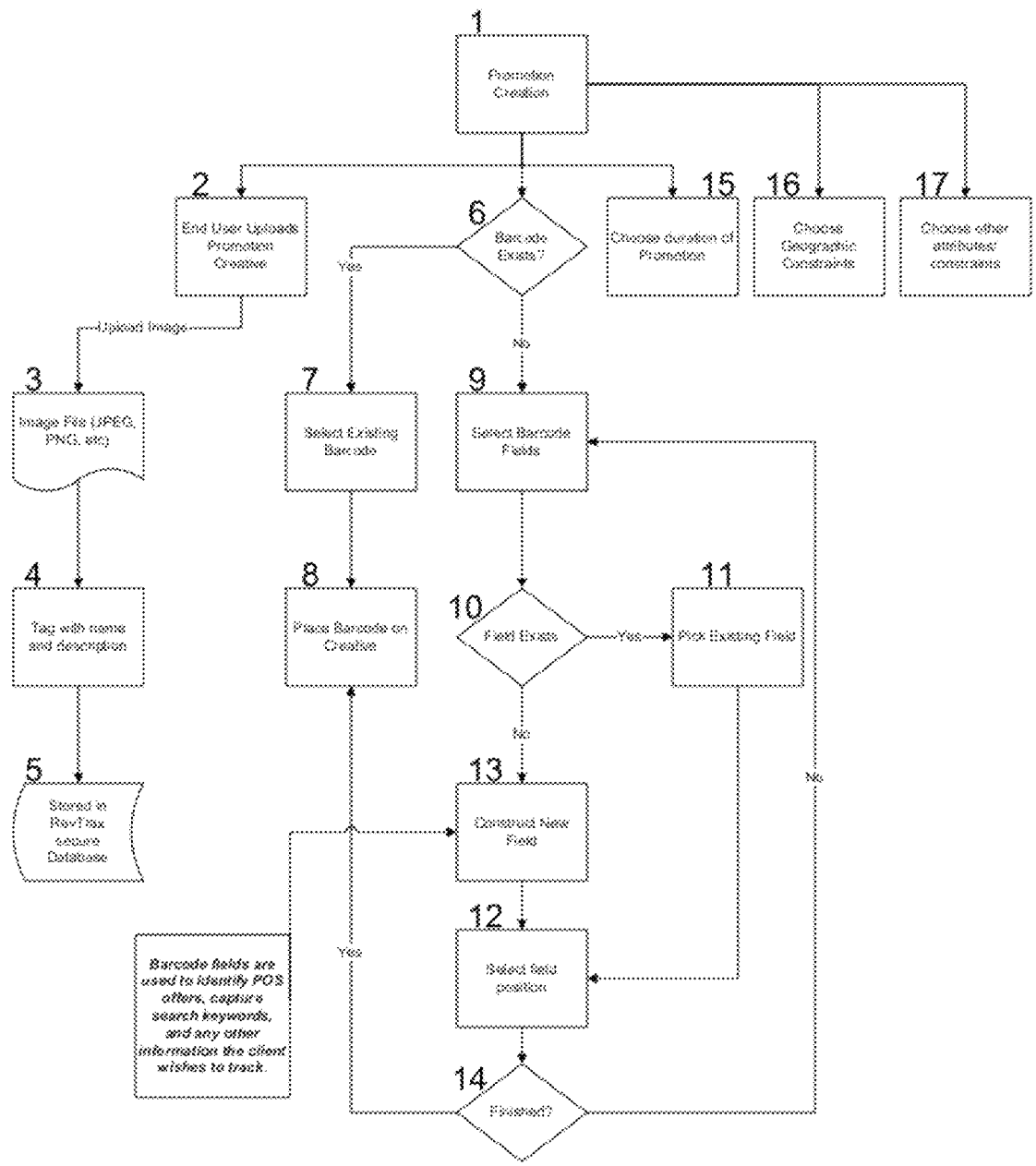
FIG. 1B is a flowchart representation of an embodiment of a process for creating an in-store promotion according to the present invention.

Referring to FIG. 1B, an embodiment of a method for creating an in-store promotion is shown. In one embodiment, the system provides for the creation and management of in-store promotions through a user interface that is accessible to the advertiser (user) via a secure login. In addition, the user may have fine grained control over the distribution channels. In step 1, the retailer, advertiser or other entity offering a promotion creates the promotion. As described above, the retailer, advertiser or other entity offering a promotion may also be referred to herein as the "user". Next in step 2, the user uploads a promotion creative. The promotion creative may include the "look and feel" of the in-store promotion that the consumer views. Different in-store promotion creative may be applicable or better suited for different types of distribution channels. The promotion creative may be an image file, text file, sound file, video file or any combination of the foregoing. Advertisers can upload any in-store promotion creative of their choice. In-store promotion creative can also be used for multiple in-store promotions if desired. In the example shown in the flowchart of FIG. 1B, the promotion creative is an image file such as a JPG, PNG, or any other type of image file. In step 3, the image file is received by the promotion server, which in turn tags the image file with a name and description in step 4 and then stores the file in a creative library or database in step 5. By storing the promotion creative, the creative is available for use in other in-store promotions. The dimensions and layouts of the in-store promotion creative may be selected by the user.

Once the in-store promotion creative has been uploaded, in one embodiment, the user may select to include a barcode(s) (and the position of the barcode(s)) and dynamic text (optional) or logos. The dynamic in-store promotion text can be specified at run-time through the distribution channel or can be calculated text, such as an expiration date. The dynamic text can be provided either at run time or through predetermined fields such as "expiration date". In yet other embodiments, the user may provide high level information of the in-store promotion such as begin date, end date, or other information.

In an embodiment in which the user (advertiser) desires to include a barcode, the process of creating a new barcode includes choosing the appropriate fields in length and position to capture the desired information. In one such embodiment, the barcodes include fields for both point-of-sale usage as well as for capturing data. Additional bar code fields can be created to capture data not previously captured. Referring again to FIG. 1B, in an embodiment in which the user desires to include a barcode, in step 6 the user determines if the desired barcode structure for the promotion exists in the system. If a desired barcode layout exists already in the system, it may be chosen from the list of existing barcode layouts. If not, the user may create a new barcode layout, which is then stored as a library element in the user's account for use in future promotions. If the desired barcode structure exists, the user may select it for the promotion in step 7 and place it on or associate it with the creative in step 8. The user may also select the position of the barcode. In one embodiment, barcodes are overlaid on the in-store promotion at runtime and can be positioned anywhere on the in-store promotion.

If the desired barcode structure does not exist in the system, in step 9 the user creates a new barcode by selecting from available barcode fields. If the user determines that the desired field exists in step 10, the user can select the existing field in step 11 and then in step 12 select the position for the field within the barcode structure. If the user determines that the desired field does not exist in step 10, the user can construct a new field in step 13 and then proceed to step 12 and select a position for the field within the barcode structure. Fields can also be created to capture information not previously available. There is no limit to the information that can be captured in a barcode.

If in step 14, the user determines that the barcode is not complete, the user returns to step 9, selects additional barcode fields and repeats the process. This process of choosing and/or creating barcode fields continues until enough fields are in the barcode to both identify the offer at the point of sale ("POS") and capture the desired information. If in step 14 the user determines that the barcode is complete, the process returns to step 8 and the barcode is placed on or associated with the creative. In other embodiments, the user specifies a start date and expiration date for the promotion (step 15), adds geographic constraints (step 16), and/or other attributes/constraints (step 17) for the promotion. In one embodiment, the start date is the date when the in-store promotion is available for distribution to consumers. In another embodiment, the end date is the date after which the in-store promotion is no longer available for distribution to consumers.

Figure 2:
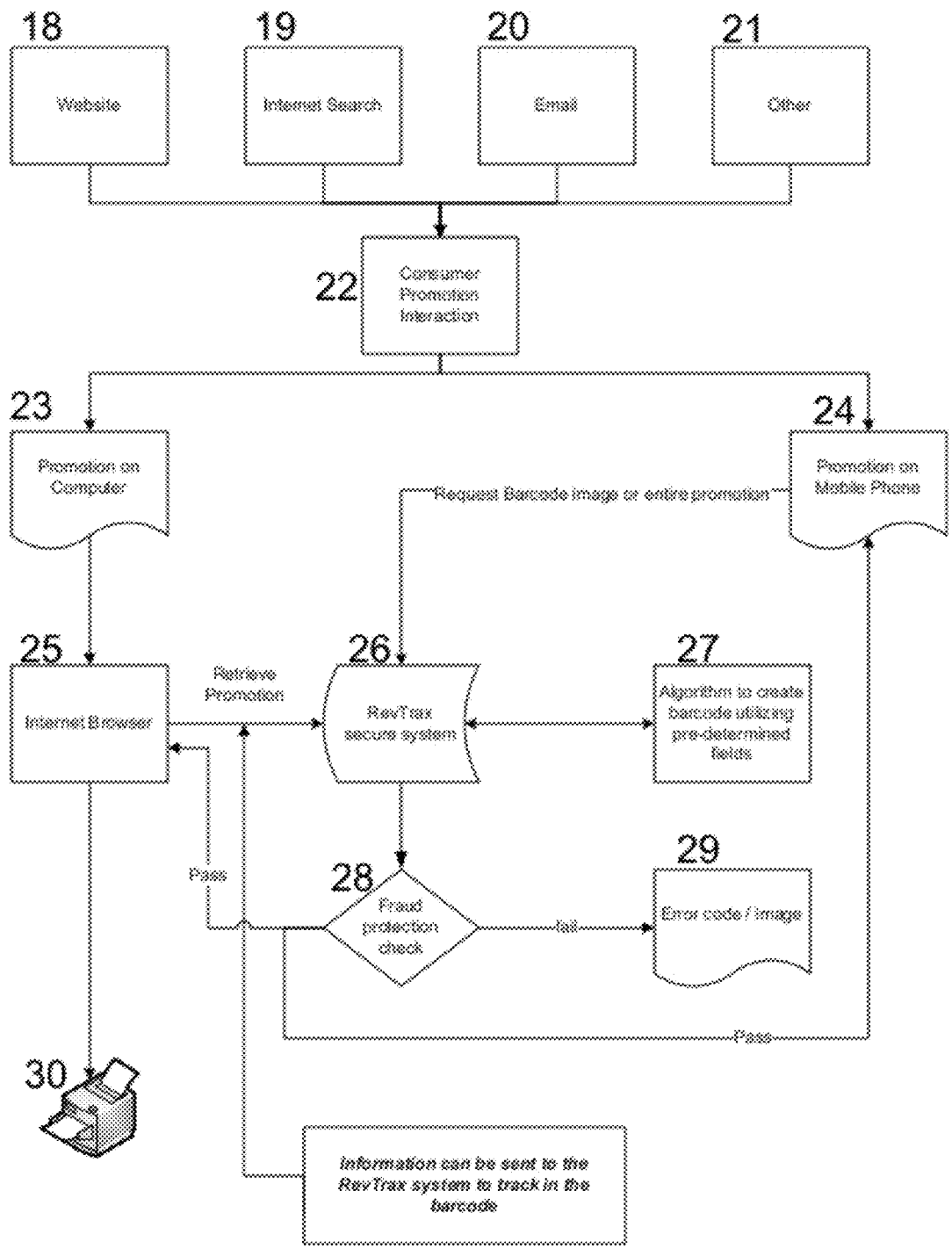
FIG. 2 is a block diagram an embodiment of a system according to the present invention illustrating typical consumer interactions with an in-store promotion created using the system.

As best shown in FIG. 2, distribution channels for an in-store promotion may include the Internet (through either websites or search results), email delivery and mobile phone delivery. Therefore, a consumer may utilize a website 18, internet search 19, email 20, or other method 21 to interact with a promotion 22. The promotion may be accessed via a computer 23, mobile phone 24, or other device. If the promotion is accessed via a computer 23, in one embodiment, the computer's internet browser 25 requests the promotion from the secure system 26, which then uses an algorithm to create the barcode/promo code utilizing pre-determined fields 27 and validates the request against any security/fraud protection rules 28. If the request fails the check against the security/fraud protection rules 28, the consumer sees an error code/image 29. If the request passes the check against the security/fraud protection rules 28, the promotion is sent back to the consumer's internet browser 25 and the consumer is able to send the promotion to the printer 30 without any type of software download required.

If the promotion is accessed via a mobile phone 24, the mobile phone requests the promotion from the secure system 26, which then uses an algorithm to create the barcode/promo code utilizing pre-determined fields 27 and validates the request against any security/fraud protection rules 28. If the request fails the check against the security/fraud protection rules 28, the consumer sees an error code/image 29. If the request passes the check against the security/fraud protection rules 28, the promotion is sent back to the consumer's mobile phone 24.

Distribution channels include the internet (including but not limited to websites and search results), email delivery, mobile phone and any other technology that is able to transmit the promotion to the consumer's device. The consumer may view the in-store promotion on the internet or via an email. The consumer may open the in-store promotion in any web browser without any additional software and no registration. All fraud protection elements of the promotion are run and checked against the available data. The consumer can print the in-store promotion on any printer capable of printing graphics (no special software is required) or utilize the image on a mobile phone.

Figure 3:
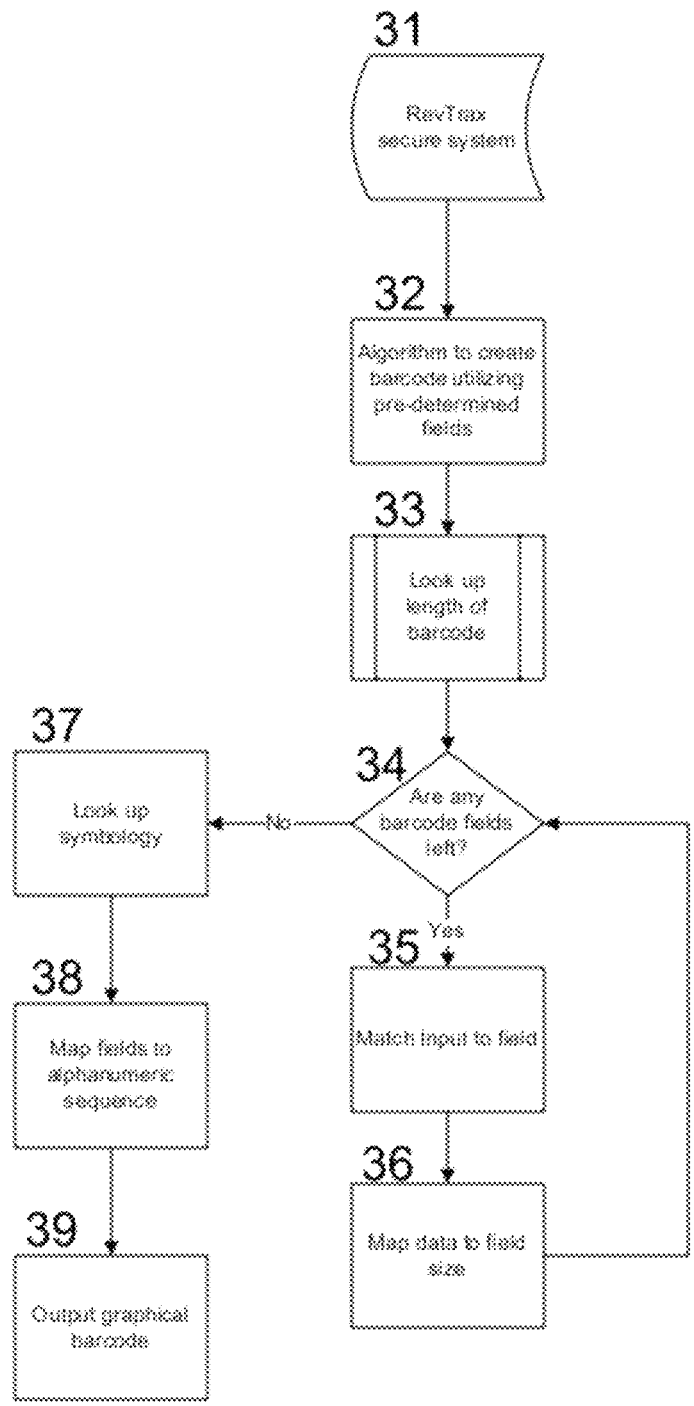
FIG. 3 is a flowchart representation an embodiment of a process for generating a barcode according to the present invention.

In one embodiment including barcodes in the offer, the barcodes are generated in real time utilizing all available data. The request to deliver an in-store promotion and/or a barcode and each field in the barcode is analyzed and the data is gathered. The data that covers all fields is run through an algorithm which ensures the length of the barcode and content matches the advertiser's specifications. As best shown in FIG. 3, when the secure system receives a request for a promotion in step 31, the secure system utilizes an algorithm to create a barcode utilizing predetermined fields in step 32. The system then looks up the pre-determined length of the barcode in step 33. The system then creates at least one barcode field and checks if any barcode fields are left in step 34. If any barcode fields are left in step 34, the system matches a data input to the field in step 35, and maps the data to the field, ensuring that the data fits the pre-determined field size in step 36. If any barcode fields are not left in step 34, the system looks up the predetermined symbology of the barcode in step 37, then maps the fields to an alphanumeric sequence in step 38 and generates a graphical barcode as an output in step 39.

As described above in the discussion of FIG. 2, the barcode fields that are used to capture data can be chosen from a library of fields. Fields can be created at the discretion of the advertiser to satisfy the advertiser's data capture requirements. The field lengths and the field positions may be at the discretion of the advertiser's. The barcode symbology may also be chosen by the advertiser. For example, the advertiser may select from: UPC, Code 128, EAN, GS1 Databar, QR Codes, and other type of barcode symbologies. Each of the data fields are mapped to available data that is provided to the system at runtime. When the in-store promotion is viewed, the distribution channel requests the in-store promotion from the server with all available data. The data is matched to each barcode field and formatted to fit the format specified by the advertiser. Depending on the selections of the advertiser, the same data can result in different bar codes, and may capture the same or different information for different in-store promotions.

Figure 4A:
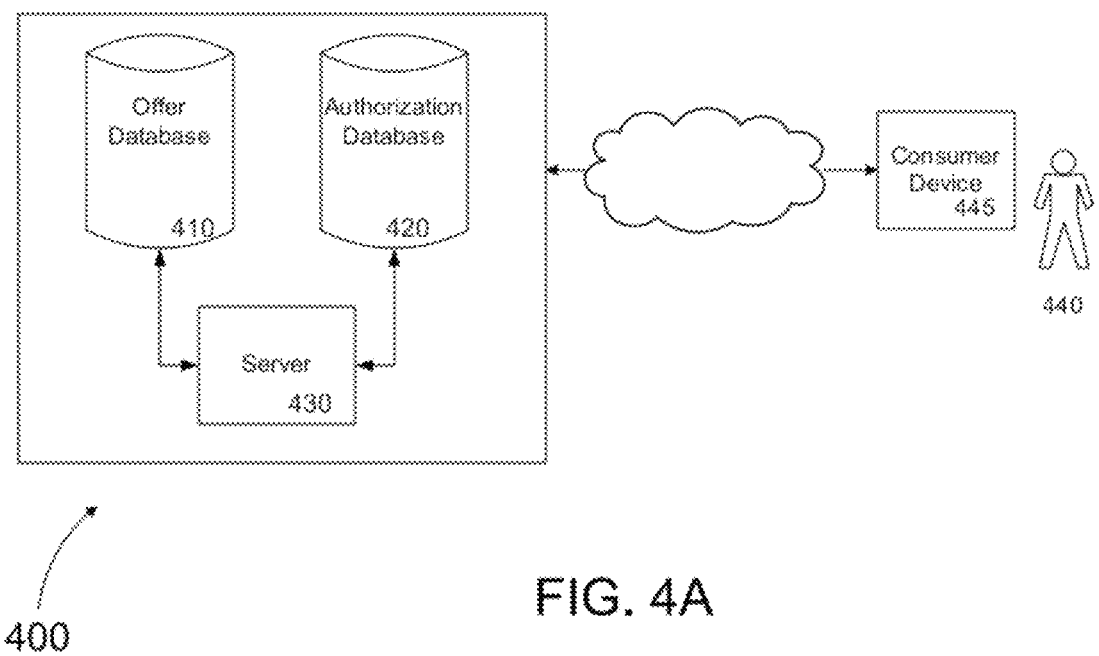
FIG. 4A is a block diagram of an embodiment of a system for delivering authorized in-store promotions to consumers.

Referring now to FIG. 4A, an embodiment of a system 400 for preventing fraud and helping to ensure that only authorized consumers receive the in-store promotion is shown. The fraud prevention system 400 includes an offer database 410, an authorization database 420 and a server 430. The offer database 410 stores a plurality of offer data items for use in creating the in-store promotion. The plurality of offer data items may be fields for the user/advertiser to enter information, promotion creative such as image files, text files, sound files, video files or any combination of the foregoing, and any other of the items discussed above for use in creating an in-store promotion. The authorization database stores authorization parameters. In one embodiment, each in-store promotion sent to a consumer receives a unique authorization parameter. In another embodiment, the same authorization parameter may be used for all the targeted consumers in a campaign. The authorization parameter may be a number, an alphanumeric code, or any other identifier that may be included in a link to an in-store promotion.

Figure 4B:
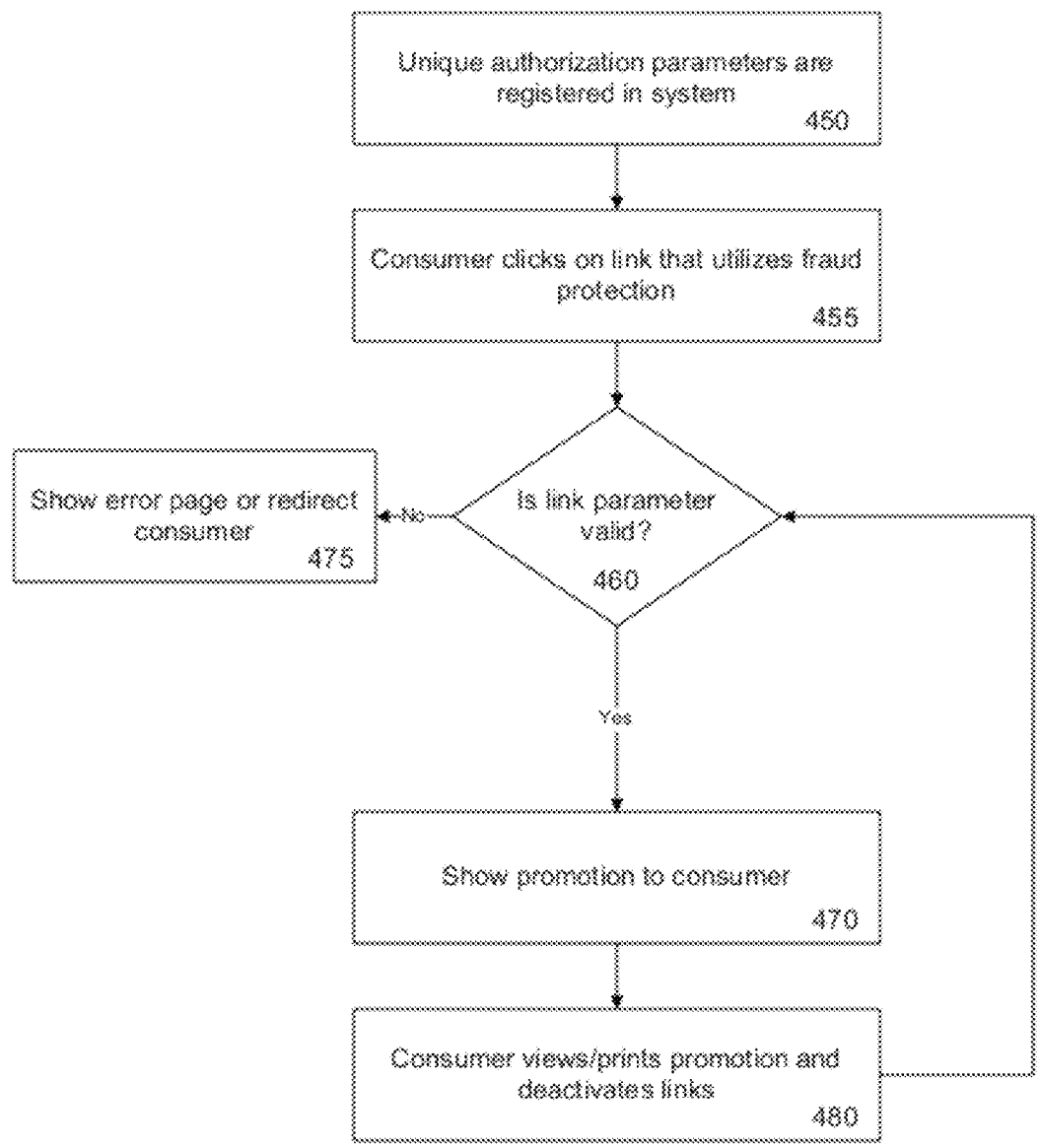
FIG. 4B is a flowchart representation of an embodiment of a process for determining if a consumer is authorized to receive an in-store promotion according to the present invention.

The operation of the system 400 will be described in more detail using the flowchart of FIG. 4B. In step 450, unique authorization parameters for promotion links are registered in the system 400 and stored in the authorization database 420. Next, links to the in-store promotion containing the authorization parameters are sent to consumers. In step 455, a consumer 440 invokes the link to the promotion using a consumer device 445. Upon the consumer 440 invoking the link, the server 430 receives a request from the consumer device 445 to present the in-store promotion. Next, in step 460, the server 430 checks the link parameters using information from the authorization database 420 to verify that the link is valid and the request is authorized. The server 430 does not request any additional information from the consumer 440 operating the device 445 to perform the verification.

If the link is valid (i.e. contains the authorization parameter) and the request is authorized, the system 400 proceeds to step 470 and the server 430 dynamically generates the in-store promotion using at least one of the plurality of data items stored in the offer database 410 and transmits the in-store promotion to the consumer device 445. The consumer 440 may then view, print or perform another operation on the in-store promotion on the consumer device 445 in step 480.

If the link is not valid (i.e. does not contain the authorization parameter), the request is not authorized and the system 400 proceeds to step 475. In step 475, the server 430 presents an error page to the consumer 440 or redirects the consumer 440 to another page, such as the advertiser's loyalty/email club program sign up page.

In other embodiments, when the user creates the in-store promotion, the user may select a single authorization parameter or a plurality of authorization parameters to be verified by the server. In yet another embodiment, use of the authorization parameter and the authorization parameter itself are configurable by the user. For example, the authorization parameter in one embodiment may be used to limit the number of times that an in-store promotion may be printed. In this example, the user may specify the quantity. In an embodiment that the in-store promotion may only be printed a single time, to verify that the request to present an in-store promotion is valid, the server 430 must determine whether the in-store promotion was previously requested to be printed by the consumer device 445. If the user specifies that the in-store promotion may be printed no more than N times, N being a whole number greater than 1, the server 430 may track whether the in-store promotion is printed. In one such embodiment, the system 400 may track a browser identifier of the browser executing on the consumer device 445.

In another embodiment, the authorization parameter limits websites posting the in-store promotion. In order to determine if the request to present the in-store promotion is authorized, the server 430 determines whether the in-store promotion is requested through an authorized website. In one such embodiment, the authorization database 420 stores the domains of authorized websites and the server 430 verifies that the domain of a website through which the request is received is one of the authorized websites.

In still another embodiment, the authorization parameter restricts forwarding of the in-store offer by the consumer device 445.

In another embodiment, the system 400 of FIG. 4A may be used to control how many times an in-store promotion is viewed or printed by assigning a status to the authorization parameter. For example, as described above, the advertiser may desire the link to be a single-use link that may only be used to access the in-store promotion a single time. In one such embodiment, the authorization parameter is assigned a corresponding status, such as active/inactive, valid/invalid, or any other status designation that enables the system 400 to determine if the in-store promotion may be presented. Only links that contain the registered parameters having an "active" status are allowed to access the promotion. When a consumer invokes the link for the first time, the consumer can view or print the in-store promotion. For a single-use link, the status of the parameter is then changed to "inactive". As described above, when a user invokes an invalid or deactivated link, the consumer may be shown an error message or redirected to another page, such as the advertiser's loyalty/email page. In another embodiment, the advertiser can set the number of times that an in-store promotion may be viewed and/or printed to any number that the advertiser desires.

Figure 5:
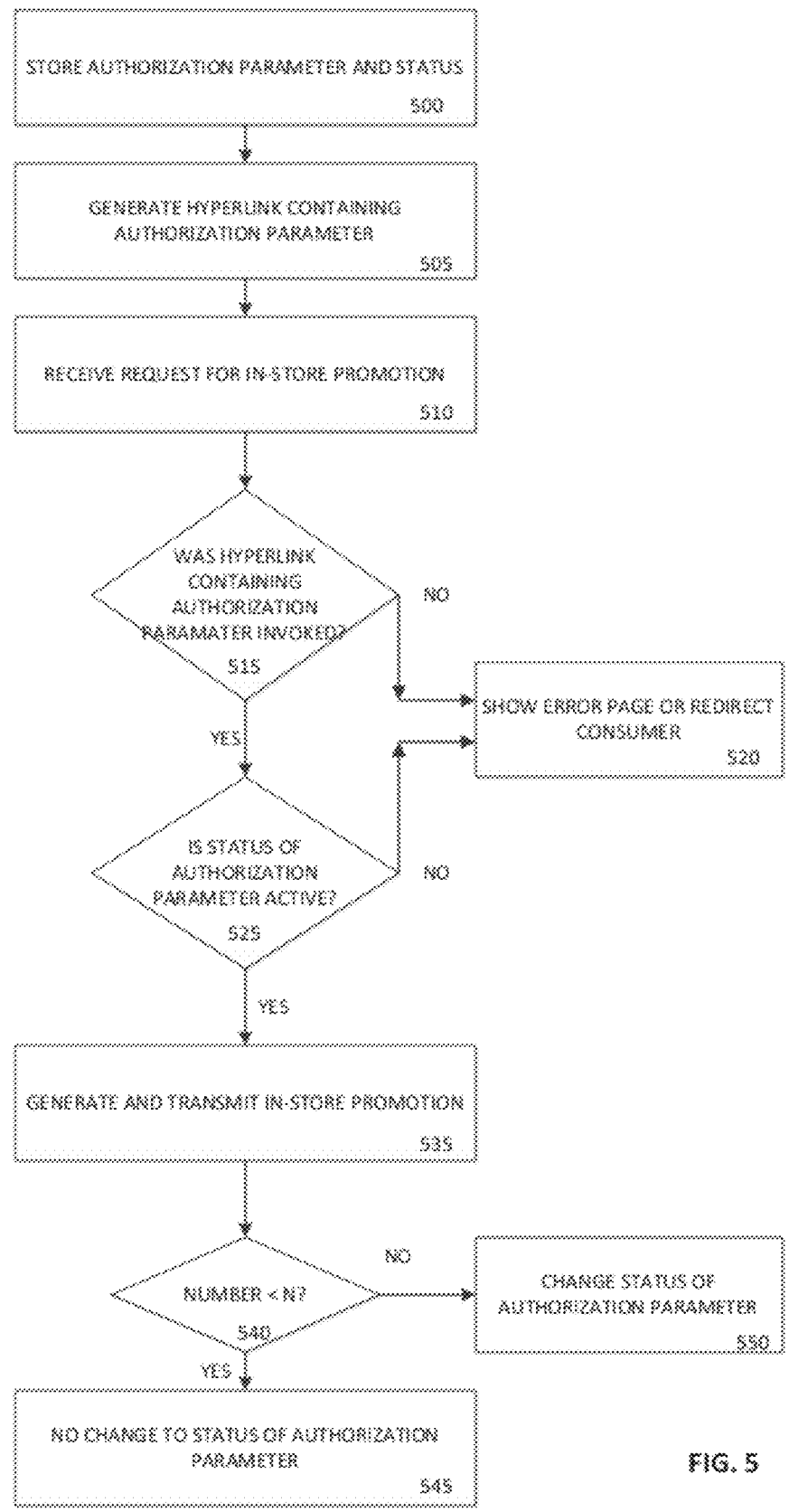
FIG. 5 is a flowchart representation of an embodiment of a process for delivering a restricted use in-store promotion according to the present invention.

The operation of system assigning a status to the authorization parameter to control the number of times that an in-store promotion is viewed or printed will be described in more detail using the flowchart of FIG. 5. In step 500, unique authorization parameters for promotion links and a corresponding status for each of the parameters are registered in the system 400 and stored in the authorization database 420. In different embodiments, there may be a single authorization parameter, or there may be a plurality of authorization parameters. The user specifies that the in-store promotion may be viewed and/or printed no more than N times, N being a whole number equal to or greater than 1. This N value is also stored by the system 400. Next, in step 505, the server 430 generates hyperlinks to the in-store promotion containing the authorization parameters. The hyperlinks are made available to potential consumers. In one embodiment, the hyperlinks are made available to potential consumers through a digital distribution channel. In different embodiments, the digital distribution channels may be email, posting the hyperlink on an authorized website, sending a text message, or any other method of conveying information electronically.

In step 510, a consumer 440 invokes the link to the promotion using a consumer device 445. Upon the consumer 440 invoking the link, the server 430 receives a request from the consumer device 445 to present the in-store promotion in step 510. Next, in step 515, the server 430 checks the link parameters using information from the authorization database 420 to verify that the link contains one of the registered authorization parameters. The server 430 does not request any additional information from the consumer 440 operating the device 445 to perform the verification.

As described above in the discussion of FIG. 4B, if the link is not valid (i.e. does not contain the authorization parameter), the request is not authorized and the system 400 proceeds to step 520. In step 520, the server 430 presents an error page to the consumer 440 or redirects the consumer 440 to another page, such as the advertiser's loyalty/email club program sign up page.

If the link is contains a registered the authorization parameter, the system 400 proceeds to step 525 and the server 430 checks the status of the authorization parameter. If the status is "invalid", the server 430 proceeds to step 520 as discussed above. If the status is "valid", the server proceeds to step 535 and dynamically generates the in-store promotion using at least one of the plurality of data items stored in the offer database 410 and transmits the in-store promotion to the consumer device 445. The consumer 440 may then view, print or perform another operation on the in-store promotion on the consumer device 445.

Next, in step 540, the server 430 determines whether the in-store promotion has been viewed and/or printed a number of times less than the number N designated by the user. If the number of views/prints is less than N, the status of the authorization parameter remains the same (step 545). If the number of views/prints is greater than N, the server 430 proceeds to step 550 and changes the status of the authorization parameter to "inactive". Once the status is changed, the link containing the authorization parameter is deactivated and may no longer be used to access the in-store promotion. In one embodiment of the system 400, this is made possible due to the in-store promotion being dynamically generated in real-time in response to the request received by the server 430.

In one embodiment utilizing authorization parameters having a status, the status is changed to inactive after a predetermined number of times that the promotion is accessed. In another embodiment, the status is changed to inactive after a predetermined number of times that a print request is made for the in-store promotion. In yet another embodiment, the status is changed to inactive after a predetermined number of times that the in-store promotion is printed.

Having described various embodiments of the invention, it will now become apparent to one of ordinary skill in the art that other embodiments incorporating the concepts may be used. It is felt, therefore, that these embodiments should not be limited to the disclosed embodiments, but rather should be limited only by the spirit and scope of the following claims.

What is claimed is:

1. A method for digitally delivering a restricted use in-store promotion from a server computer for a service to a consumer device for a consumer through a digital communication channel, comprising:
   storing in an offer database on a computer a plurality of offer data items for use in creating a plurality of in-store promotions;
   storing in an authorization database on a computer a plurality of authorization parameters, wherein at least some of the authorization parameters have a corresponding status stored in the authorization database;
   receiving a selection from a user of:
      one or more offer data items from the offer database for an in-store promotion, wherein the in-store promotion has an identifier identifying the in store promotion in the offer database and associated with the selected one or more offer data items, and
      an authorization parameter, with a corresponding status, to be associated with the in-store promotion, wherein use of the authorization parameter to limit access to the promotion is configurable by the user from among a set of options comprising a number, specified by the user, of permitted requests to access the in-store promotion, and wherein the corresponding status is updated to inactive after the number of permitted requests to access the in-store promotion is received;
   in response to the selection from the user, generating a hyperlink related to the in-store promotion, wherein the hyperlink includes at least:
      a. a unique reference locator for a program that dynamically generates the in-store promotion,
      b. the identifier identifying the in store promotion, and
      c. the selected authorization parameter;
   in response to the selection from the user, storing the selected authorization parameter, with the corresponding status, in the authorization database in a manner associated with the in-store promotion;
   causing the hyperlink including the selected authorization parameter for the in-store promotion to be distributed over one or more digital communication channels to one or more consumer devices for one or more consumers, without requiring the consumers to be registered with the service;
   in response to a consumer invoking the hyperlink on a consumer device, receiving at a server computer a request from the consumer device to access the in-store promotion related to the hyperlink, wherein the request includes information related to the request and at least the authorization parameter from the hyperlink and the identifier of the in-store promotion;

in response to receiving the request, the server computer running the program identified by the unique reference locator, the program configuring the server computer to:
  a. verify that the request is authorized by using the authorization parameter included in the request and the status of the authorization parameter from the authorization database;
  b. in response to verifying the request is authorized, dynamically generate the requested in-store promotion using the offer data items selected for the in-store promotion identified in the request and stored in the offer database;
  c. further in response to verifying the request is authorized, update the status of the authorization parameter in the authorization database for the in-store promotion; and
  d. transmit the dynamically generated in-store promotion from the server computer to the consumer device through a digital communication channel without requiring the consumer device to have software from the service for the consumer device to print the in-store promotion.

2. The method of claim 1, wherein updating the status comprises changing the status to inactive after the in-store promotion is accessed.

3. The method of claim 1, wherein updating the status comprises changing the status to inactive after a print request for the in-store promotion is issued.

4. The method of claim 1, wherein updating the status comprises changing the status to inactive after the in-store promotion is printed a predetermined number of times.

5. The method of claim 1 wherein causing the hyperlink including the selected authorization parameter for the in-store promotion to be distributed over one or more digital communication channels comprises sending the hyperlink through electronic mail.

6. The method of claim 1 wherein causing the hyperlink including the selected authorization parameter for the in-store promotion to be distributed over one or more digital communication channels comprises posting the hyperlink on an authorized website.

7. The method of claim 1 further comprising the step of: transmitting an error message from the server to the consumer device if the consumer device did not invoke the hyperlink containing the authorization parameter.

8. The method of claim 1 further comprising the step of: transmitting an error message from the server to the consumer device if the status is inactive.

9. The method of claim 1 further comprising the step of: redirecting the consumer device if the consumer device did not invoke the hyperlink containing the authorization parameter.

10. The method of claim 1 further comprising the step of: redirecting the consumer device if the status is inactive.

11. A method for digitally delivering a restricted use in-store promotion from a server computer for a service to a consumer device for a consumer through a digital communication channel, comprising:
  storing in an offer database on a computer a plurality of offer data items for use in creating a plurality of in-store promotions;
  storing in an authorization database on a computer a plurality of authorization parameters and, for each authorization parameter, a corresponding status, each of the plurality of authorization parameters being associated with one of the plurality of in-store promotions;
  receiving a selection from a user of:
    offer data items from the offer database for an in-store promotion, wherein the in-store promotion has an identifier identifying the in store promotion in the offer database and associated with the selected offer data items,
    an authorization parameter, with a corresponding status, to be associated with the in-store promotion, and
    a number, specified by the user, of permitted requests to access the in-store promotion, wherein the corresponding status is updated to inactive after the number of permitted requests to access the in-store promotion is received;
  in response to the selection from the user, generating a hyperlink related to the in-store promotion wherein the hyperlink includes at least:
    a. a unique reference locator for a program that dynamically generates the in-store promotion,
    b. the identifier identifying the in store promotion, and
    c. the selected authorization parameter;
  causing the hyperlink including the selected authorization parameters for the in-store promotion to be distributed over one or more digital communication channels to one or more consumer devices for one or more consumers, without requiring the consumers to be registered with the service;
  in response to a consumer invoking the hyperlink on a consumer device, receiving at a server computer a request from the consumer device to access the in-store promotion related to the hyperlink, wherein the request information related to the request and includes at least the authorization parameter from the hyperlink and the identifier of the in-store promotion;
  in response to receiving the request, the server computer running the program identified by the unique reference locator, the program configuring the server computer to:
    a. verify that the request is authorized by using the authorization parameter included in the request and the status of the authorization parameter from the authorization database;
    b. in response to verifying the request is authorized and verifying that the authorization parameter status is active, dynamically generate the requested in-store promotion using the offer data items selected for the in-store promotion identified in the request and stored in the offer database;
    c. further in response to verifying the request is authorized, update the status of the authorization parameter in the authorization database for the in-store promotion; and
    d. transmit the dynamically generated in-store promotion from the server computer to the consumer device through a digital communication channel without requiring the consumer device to have software from the service for the consumer device to print the in-store promotion.

12. A computer system for digitally delivering a restricted use in-store promotion from a server computer for a service to a consumer device for a consumer through a digital communication channel, the computer system comprising:
  an offer database on a computer storing a plurality of offer data items for use in creating in-store promotions;

an authorization database on a computer storing a plurality of authorization parameters, wherein at least some of the authorization parameters have a corresponding status; and a server computer in communication with the offer database and the authorization database, wherein the server computer includes computer program code in storage and a processing device that executes the computer program code to configure the server computer to:

receive a selection from a user of:
  offer data items from the offer database for use in an in-store promotion, wherein the in-store promotion has an identifier identifying the in store promotion in the offer database and associated with the selected offer data items,
  an authorization parameter, with a corresponding status, to be associated with the in-store promotion, and
  a number, specified by the user, of permitted requests to access the in-store promotion, wherein the corresponding status is updated to inactive after the number of permitted requests to access the in-store promotion is received;

in response to the selection from the user, generate a hyperlink related to the in-store promotion wherein the hyperlink includes at least:
  a. a unique reference locator for a program that dynamically generates the in-store promotion,
  b. the identifier identifying the in store promotion, and
  c. the selected authorization parameter associated with the in store promotion;

cause the hyperlink to be distributed over one or more digital communication channels to one or more consumer device for one or more consumers, without requiring the consumer to be registered with the service;

in response to a consumer invoking the hyperlink on a consumer device, receive a request from the consumer device to access the in-store promotion related to the hyperlink, wherein the request includes information related to the request and at least the selected authorization parameter from the hyperlink an the identifier of the in-store promotion; and in response to receiving the request, run the program identified by the unique reference locator, the program configuring the server computer to:
  a. verify that the request is authorized and the status of the authorization parameter included in the hyperlink is active, using the authorization database,
  b. in response to a determination that the request is authorized and the status of the authorization parameter is active, dynamically generate the requested in-store promotion using at least one of the plurality of offer data items stored in the offer database,
  c. further in response to a determination that the request is authorized and the status of the authorization parameter is active, update the status of the authorization parameter for the requested in-store promotion in the authorization database, and
  d. transmit the dynamically generated in-store promotion to the consumer device through a digital communication channel without requiring the consumer device to have software from the service for the consumer device to print the in-store promotion.

13. The system of claim 12 wherein the server changes the status of the authorization parameter to inactive after the in-store promotion is accessed.

14. The system of claim 13 wherein the server changes the status of the authorization parameter to inactive after a print request for the in-store promotion is issued.

15. The system of claim 14 wherein the server changes the status of the authorization parameter to inactive after the in-store promotion is printed a predetermined number of times.

16. The system of claim 12 wherein the server makes the hyperlink available to potential consumers through a digital distribution channel.

17. The system of claim 16 wherein the digital distribution channel is email.

18. The system of claim 16 wherein the digital distribution channel is posting the hyperlink on an authorized website.

19. The system of claim 12 wherein the server transmits an error message to the consumer device if the consumer device did not invoke the hyperlink containing the authorization parameter.

20. The system of claim 12 wherein the server transmits an error message to the consumer device if the status is inactive.

21. The system of claim 12 wherein the server redirects the consumer device if the consumer browser did not invoke the hyperlink containing the authorization parameter.

22. The system of claim 12 wherein the server redirects the consumer device if the status is inactive.

23. A system for digitally delivering a restricted use in-store promotion from a server computer for a service to a consumer device for a consumer through a digital communication channel, the system comprising:

an offer database arranged to store on computer storage a plurality of offer data items for use in creating in-store promotions;

an authorization database arranged to store on computer storage a plurality of authorization parameters, each of the plurality of authorization parameters having a corresponding status and being associated with one of the in-store promotions; and a server computer in communication with the offer database and the authorization database, wherein the server computer includes computer program code in storage and a processing device that executes the computer program code to configure the server computer to:

receive a selection from a user of:
  offer data items from the offer database for use in an in-store promotion, wherein the in-store promotion has an identifier identifying the in store promotion in the offer database and associated with the selected offer data items, and
  an authorization parameter, with a corresponding status, to be registered in the authorization database and associated with the in-store promotion, wherein use of the authorization parameter to limit access to the promotion is configurable by the user from among a set of options comprising a number, specified by the user, of permitted requests to access the in-store promotion, and wherein the corresponding status is updated to inactive after the number of permitted requests to access the in-store promotion is received;

in response to the selection from the user, cause a hyperlink to be distributed to multiple consumer devices over digital communication channels, the hyperlink being related to the in-store promotion wherein the hyperlink includes at least:

a. a unique reference locator for a program that dynamically generates the in-store promotion,
b. the identifier identifying the in store promotion, and
c. the selected authorization parameter associated with the in store promotion;

in response to a consumer invoking the hyperlink on a consumer device, receive a request from the consumer device to access the in-store promotion related to the hyperlink, wherein the request includes information related to the request and at least the selected authorization parameter from the hyperlink and the identifier of the in-store promotion; and in response to receiving the request, run the program identified by the unique reference locator, the program configuring the server computer to:
  a. verify the status of the authorization parameter included in the request using the authorization database,
  b. in response to verifying that the authorization parameter status is active, dynamically generate the requested in-store promotion using the selected offer data items stored in the offer database,
  c. further in response to verifying that the authorization parameter status is active, update the status of the authorization parameter for the requested in-store promotion in the authorization database, and
  d. transmit the requested in-store promotion to the consumer device through a digital communication channel without requiring the consumer device to have software from the service for the consumer device to print the in-store promotion.

24. A computer system for digitally delivering a restricted use in-store promotion from a server computer for a service to a consumer device for a consumer through a digital communication channel, the computer system comprising:

an offer database on a computer with storage including a plurality of offer data items for use in creating in-store promotions;

an authorization database on a computer with storage including a plurality of authorization parameters, each of the plurality of authorization parameters having a corresponding status and being associated with one or more of the in-store promotions; and a server computer in communication with the offer database and the authorization database, wherein the server computer includes computer program code in storage and a processing device that executes the computer program code to configure the server computer to:

receive a selection from a user of:
  offer data items from the offer database for use in an in-store promotion, wherein the in-store promotion has an identifier identifying the in store promotion in the offer database and associated with the selected offer data items, and
  an authorization parameter, with a corresponding status, to be registered in the authorization database and associated with the in-store promotion, wherein use of the authorization parameter to limit access to the promotion is configurable by the user from among a set of options comprising a number, specified by the user, of permitted requests to access the in-store promotion, and wherein the corresponding status is updated to inactive after the number of permitted requests to access the in-store promotion is received;

after receiving the selection from the user, distribute a hyperlink generated for the in-store promotion, the hyperlink being distributed to multiple consumer devices over digital communication channels wherein the hyperlink includes at least:
  a. a unique reference locator for a program that dynamically generates the in-store promotion,
  b. the identifier identifying the in store promotion, and
  c. the selected authorization parameter associated with the in store promotion;

in response to a consumer invoking the hyperlink on a consumer device, receive a request for the in-store promotion related to the hyperlink, the request further including information related to the request and at least the authorization parameter from the hyperlink and the identifier of the in-store promotion; and in response to receiving the request, run the program identified by the unique reference locator, the program configuring the server computer to:
  a. verify the status of the authorization parameter using the authorization database,
  b. after verifying that the authorization parameter status is active, dynamically generate the requested in-store promotion incorporating an offer identifier and at least the selected offer data items for the in-store promotion stored in the offer database,
  c. update the status of the authorization parameter for the in-store promotion in the authorization database after generating the in-store promotion, and
  d. transmit the generated in-store promotion to the consumer device without requiring the consumer device to have software from the service for the consumer device to print the in-store promotion.

* * * * *